L. J. BLACK.
WRENCH.
APPLICATION FILED APR. 5, 1915.
1,157,362.
Patented Oct. 19, 1915.
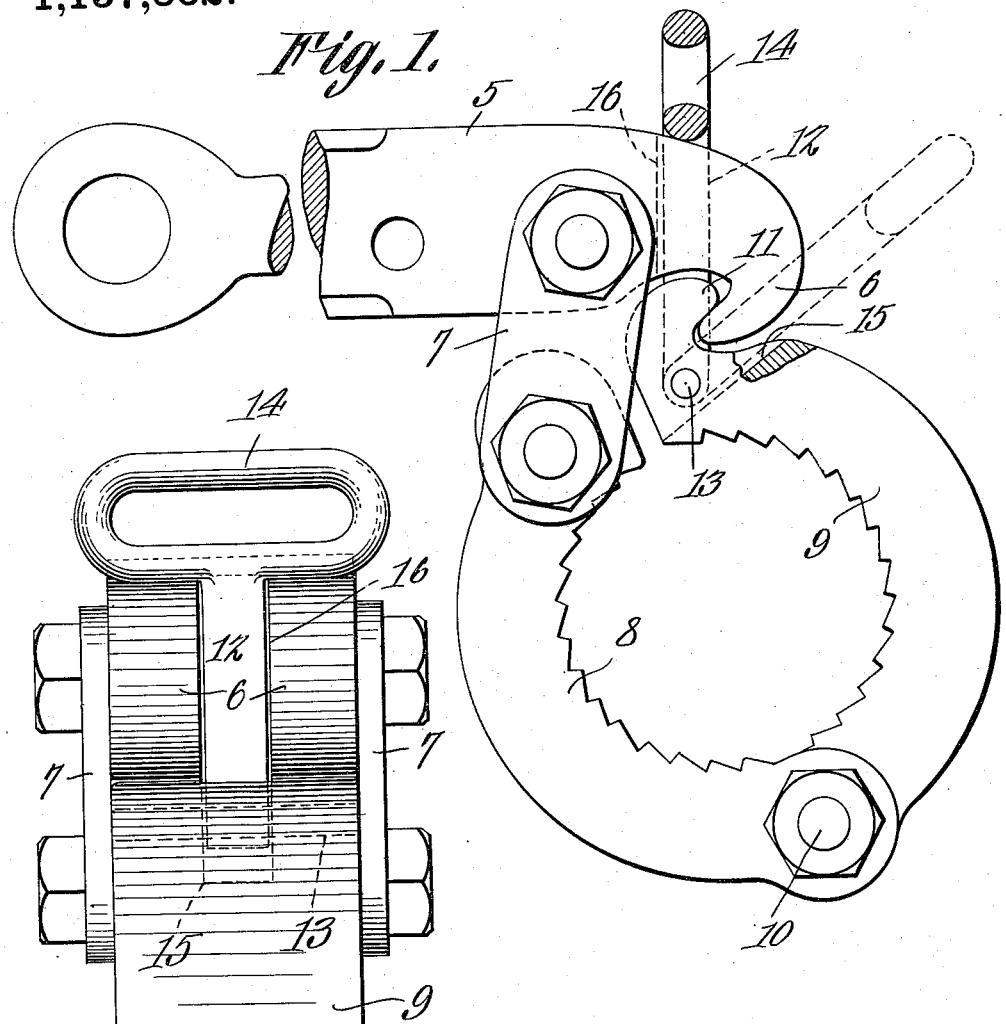
Fig. 1.
Fig. 2.
Lee J. Black
Inventor
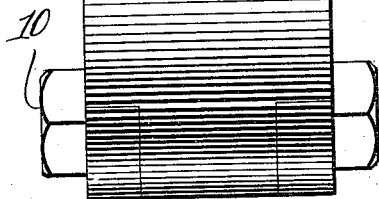
By
Attorney

UNITED STATES PATENT OFFICE.

LEE J. BLACK, OF BEAUMONT, TEXAS.

WRENCH.

1,157,362.  Specification of Letters Patent.  Patented Oct. 19, 1915.

Application filed April 5, 1915. Serial No. 19,218.

*To all whom it may concern:*

Be it known that I, LEE J. BLACK, a citizen of the United States, residing at Beaumont, in the county of Jefferson and State of Texas, have invented certain new and useful Improvements in Wrenches, of which the following is a specification.

This invention relates to wrenches or tongs having a gripping element made up of flexibly connected links, such a wrench being disclosed in Patent No. 1,128,467; and the invention has for its object to improve this wrench, the improvement consisting in a novel device for locking the gripping element after it is applied to the pipe or other part.

In order that the invention may be better understood, reference is had to the accompanying drawing, in which—

Figure 1 is a plan view of the wrench, with parts in section, and Fig. 2 is an end view of the wrench.

Referring specifically to the drawing, 5 denotes the handle of the wrench, the same having a hook 6 at its outer end, and adjacent to said hook and to the rear thereof, is loosely connected, by means of links 7, the gripping element composed of pivotally connected links 8 and 9, respectively, the pivotal connection between said links being indicated at 10. The link 8 is connected to the links 7, and the link 9 has at its free end a hook 11 adapted to be engaged by the handle hook 6 when the gripping element is placed around the pipe or other part to be gripped.

The locking device for the gripping element is a shank 12 pivoted at one end to the hook 11 of the link 9, as indicated at 13, and having at its outer free end a hand-grip 14. The hook 11 has a recess 15 to accommodate the shank 12, and the hook 6 has a recess 16 for the same purpose.

In operation, the links 8 and 9 being placed around the part to be gripped, and the hooks 6 and 11 being connected, the shank 12 is swung over into the recess 16 until the hand-grip 14 comes behind the hook 6. The hand-grip projects laterally from opposite sides of the shank, and its inner portion is adapted to come in contact with the back of the hook 6, and as this portion of the hook is inclined, the hand-grip may be tightly wedged against the inclined surface to obtain a firm hold. The links 8 and 9 are now securely locked in gripping position, so that any amount of working the handle 5 back and forth will not cause said links to get loose and release the pipe or other object gripped. To unlock the links, it is necessary only to grasp the hand-grip and swing the same off the hook 6 as shown dotted in Fig. 1. The hand-grip also serves as a hand-hold to facilitate the placing of the links around the parts to be gripped.

I claim:

1. A wrench comprising a handle having a hooked end, a flexible gripping element loosely connected to the handle to the rear of the hook thereof, the free end of said element having a hook adapted to be engaged by the handle hook, and a swinging locking device for the gripping element carried by the free end thereof and engageable over the back of the handle hook to lock said free end of the gripping element to the handle hook.

2. A wrench comprising a handle having a hooked end, a flexible gripping element loosely connected to the handle to the rear of the hook thereof, the free end of said element having a hook adapted to be engaged by the handle hook, and a swinging locking device for the gripping element carried by the free end thereof and engageable over the back of the handle hook, the part of the latter which is engaged by the locking device being inclined.

3. A wrench comprising a handle having a hooked end, a flexible gripping element loosely connected to the handle to the rear of the hook thereof, the free end of said element having a hook adapted to be engaged by the handle hook, and a swinging hand-grip carried by the free end of the gripping element and engageable over the back of the handle hook to lock said gripping element.

4. A wrench comprising a handle having a hooked end, a flexible gripping element loosely connected to the handle to the rear of the hook thereof, the free end of said element having a hook adapted to be engaged by the handle hook, said hooks of the handle and the gripping element being recessed, and a shank pivoted in the recess of the gripping element hook and adapted to be swung over into the recess of the handle hook, said shank having a transverse portion at its outer end engageable with the back of the handle hook to lock the gripping element.

5. A wrench comprising a handle having a hooked end, a flexible gripping element loosely connected to the handle to the rear of the hook thereof, the free end of said element having a hook adapted to be engaged by the handle hook, said hooks of the handle and the gripping element being recessed, and a shank pivoted in the recess of the gripping element hook and adapted to be swung over into the recess of the handle hook, said shank having a hand grip at its outer end engageable with the back of the handle hook to lock the gripping element.

In testimony whereof I affix my signature in presence of two witnesses.

LEE J. BLACK.

Witnesses:
CLIFFORD H. SAUNDERS,
CHAS. T. WILL.